(12) United States Patent
Cunha Xavier et al.

(10) Patent No.: US 7,575,254 B2
(45) Date of Patent: Aug. 18, 2009

(54) STIFFENER FIXATION ASSEMBLY FOR A PROTECTIVE ASSEMBLY THAT PROTECTS A FLEXIBLE TUBE AGAINST WEAR DUE TO FRICTION

(75) Inventors: Gaspar Cunha Xavier, Rio de Janeiro (BR); Fred Laaf, Niteroí (BR); Luiz Antonio De Araujo Duvivier de Albuquerque Mello, Rio de Janeiro (BR); Jucimar Coelho Moza, Rio de Janeiro (BR)

(73) Assignee: Technip France (FR)

( * ) Notice: Subject to any disclaimer, the term of this patent is extended or adjusted under 35 U.S.C. 154(b) by 400 days.

(21) Appl. No.: 10/570,783

(22) PCT Filed: Aug. 31, 2004

(86) PCT No.: PCT/BR2004/000162

§ 371 (c)(1),
(2), (4) Date: Aug. 1, 2006

(87) PCT Pub. No.: WO2005/021926

PCT Pub. Date: Mar. 10, 2005

(65) Prior Publication Data

US 2007/0003376 A1    Jan. 4, 2007

(30) Foreign Application Priority Data

Sep. 3, 2003    (BR) .................................. 0303446

(51) Int. Cl.
*F16L 11/12* (2006.01)

(52) U.S. Cl. ........................... 285/45; 285/114; 166/356
(58) Field of Classification Search ................. 285/114, 285/115, 116, 45, 53; 405/224, 195.1, 170, 405/183.5, 184.4, 216; 166/345, 346, 367, 166/342, 348, 349, 356, 241.6
See application file for complete search history.

(56) References Cited

U.S. PATENT DOCUMENTS

| 4,633,801 A | 1/1987 | Marshall ..................... 114/266 |
| 5,947,642 A | 9/1999 | Teixeira et al. ........... 405/195.1 |
| 6,352,115 B1 | 3/2002 | Mathieu ..................... 166/352 |

FOREIGN PATENT DOCUMENTS

| EP | 0 911 482 A2 | 4/1999 |
| WO | WO 2004/055319 | * 7/2004 |

OTHER PUBLICATIONS

International Search Report PCT/BR2004/000162 dated Dec. 17, 2004.

* cited by examiner

*Primary Examiner*—David E Bochna
(74) *Attorney, Agent, or Firm*—Ostrolenk, Faber, Gerb & Soffen, LLP

(57) ABSTRACT

A stiffener fixation assembly fixed to the outer cover of a flexible tube, the flexible tube being in contact with a stiffener in an I-tube, at the end of which a bell mouth may be fixed, whereby the stiffener fixation assembly is located between the outer surface of the flexible tube and the inner wall of a centralizer and comprises rotary pieces that are axially movable with respect to the inner wall of the I-tube and capable of eliminating the relative movement between the flexible tube and the stiffener.

6 Claims, 3 Drawing Sheets

STIFFENER FIXATION ASSEMBLY FOR A PROTECTIVE ASSEMBLY THAT PROTECTS A FLEXIBLE TUBE AGAINST WEAR DUE TO FRICTION

CROSS-REFERENCE TO RELATED APPLICATION

The present application is a 35 U.S.C. §§ 371 national phase conversion of PCT/BR2004/000162, filed Aug. 31, 2004, which claims priority of Brazilian Application No. PI 0303446-1, filed 3 Sep. 2003. The PCT International Application was published in the English language.

BACKGROUND OF THE INVENTION

The present invention relates to a protective assembly for protecting a flexible tube against wear due to friction, particularly to the protection of risers, jumpers or umbilicals with stiffeners arranged in I-tubes.

PRIOR ART AND DRAWBACKS OF THE PRIOR ART

As it is widely known, flexible tubes are connected to platforms (or tanker FPSOs-FSOs) and, shortly before reaching the platform, they pass through the inside of a stiffener, which is fixed to a bell mouth of a steel tube, also called I-tube.

Due to the movement of the waves and tides, the flexible tube moves uninterruptedly and creates friction with the inner wall of the stiffener, which causes the outer cover of the flexible tube to break. This may cause early failure of the riser or umbilical and, consequently, the operation has to be stopped for replacement of the tube, which entails very high costs, as well as loss of revenue due to the stoppage of production.

The co-pending patent application Coflex S/A PI 0205417-5, filed on Dec. 18, 2002, deals with an assembly that enables one to eliminate the relative movement between the outer cover of the flexible tube and the stiffener.

OBJECTIVES AND ADVANTAGES OF THE INVENTION

The present invention has the objective of providing another advantageous solution for eliminating the relative movement between the outer cover of the flexible tube and the stiffener, providing protection to the flexible tube that considerably increases its useful life, thus preventing the stoppage for maintenance and substantially reducing expenditures and loss of revenue, as well as possible environmental accidents.

SUMMARY OF THE INVENTION

This objective is achieved by means of a stiffener fixation assembly, fixed to the outer cover of the flexible tube, protecting the stiffener against friction wear, wherein the stiffener is solidly connected with the flexible tube. The fixation assembly comprises a double split ending, a cover and a centralizer. The double split ending is fixed to the flexible tube by the armors of the latter. The stiffener is mounted on the fixation assembly by means of a centralizer suitable for resting against the inner wall of the I-tube and guiding the displacements of the stiffener inside the I-tube.

The stiffener fixation assembly is fixed to the outer cover of the flexible tube, so as to eliminate the relative movement between the stiffener and the flexible tube after installation on the platform (or tanker FPSO2-FSOS). This assembly is located between the outer surface of the flexible tube and the inner surface of the centralizer and comprises rotary pieces and axially movable with respect to the inner wall of the I-tube. The concept indicated hereinafter is capable of eliminating the relative movement of the flexible tube with respect to the stiffener and, therefore, solves the abrasion problem.

The protective assembly according to the invention may comprise, for example, a double anchoring system, fixed to the armors of the flexible tube, enclosed by a cover filled internally with epoxy resin. The stiffener, mounted on the system, becomes solid with the flexible tube and may follow all of its movements. The system may have a centralizer fixed to the stiffener, which rests against the inner wall of the I-tube and guides the displacements of the stiffener inside the I-tube; a trumpet coated internally with a polymeric material for preventing wear of the outer cover of the flexible tube.

The above-described flexible tube may be, or example, a riser, a jumper or an umbilical.

Thus, the stiffener fixation assembly fixed to the outer cover of the flexible tube, according to the present invention, advantageously enables the flexible tube to have a much longer useful life than the flexible tubes arranged in I-tubes, according to the prior art. Moreover, in this way one avoids the need for intermediate connections, as well as the cutting of lines in case it becomes necessary to reposition the system along the line.

The invention will not be described in greater detail, by way of example, with reference to the attached figures.

Other features and advantages of the present invention will become apparent from the following description of the invention which refers to the accompanying drawings.

DESCRIPTION OF A PREFERRED EMBODIMENT

Figure 1:
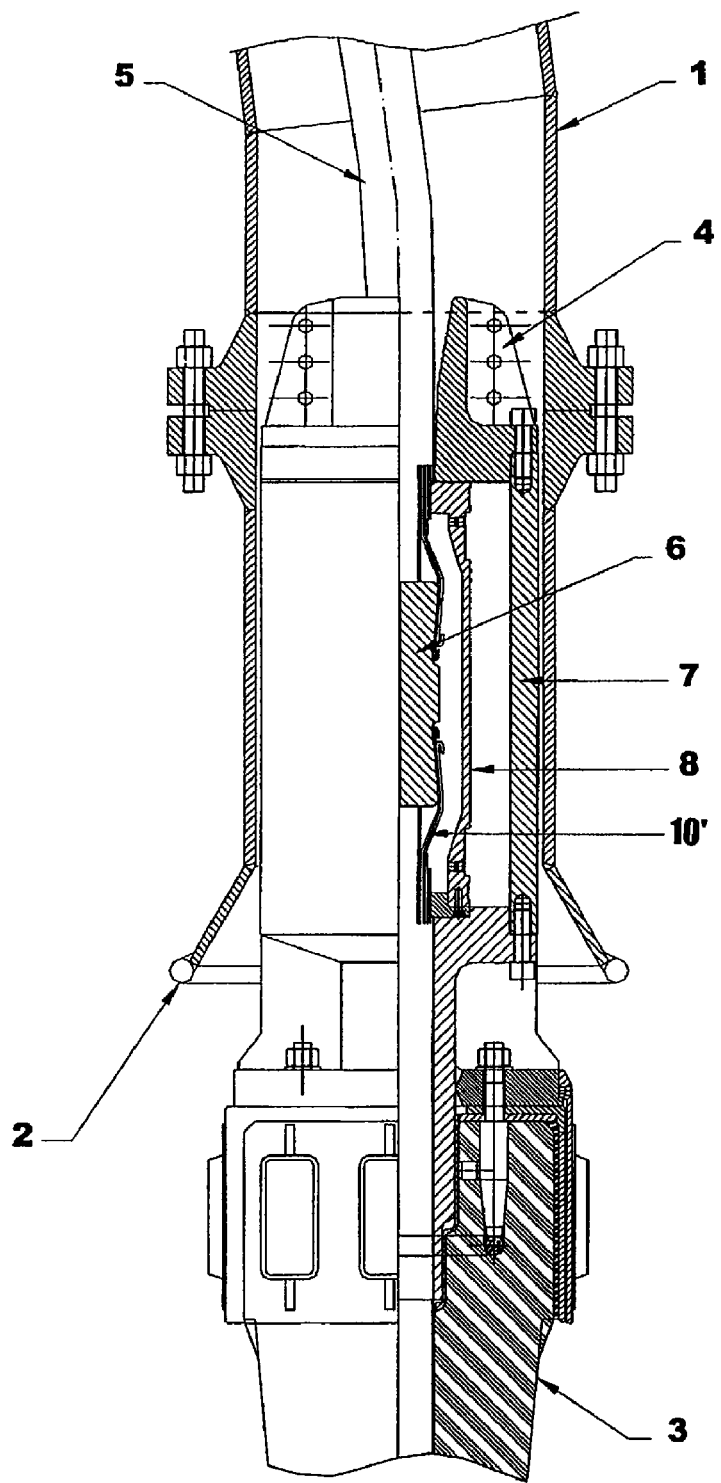
FIG. 1 is a cross-sectional view of an embodiment of the invention.

FIG. 1 shows an I-tube 1, to the end of which a bell mouth 2 may be fixed.

A stiffener 3 is partly arranged inside the I-tube 1. A trumpet 4 is mounted at an end of the stiffener 3 by means of a centralizer 7, which rests against the inner wall of the I-tube 1 and guides the displacements of the stiffener 3 inside the I-tube 1. The centralizer 7 enables rotary and axial motion of the trumpet (4) with respect to the I-tube (1), said trumpet (4) remaining solidly with the flexible tube (5).

The flexible tube 5 passes inside the stiffener 3 and an anchoring system, which may be, for instance, a double split ending 6 that is fixed to the flexible tube 5, is protected by a cover 8 that is internally filled with resin, for example an epoxy resin 9. The stiffener 3 is mounted on said anchoring system 6 and, thus, it remains solidly with the flexible tube 5 and may follow its movements. There are also armors 10, 10' acting in conjunction with the double split ending.

Figure 2:
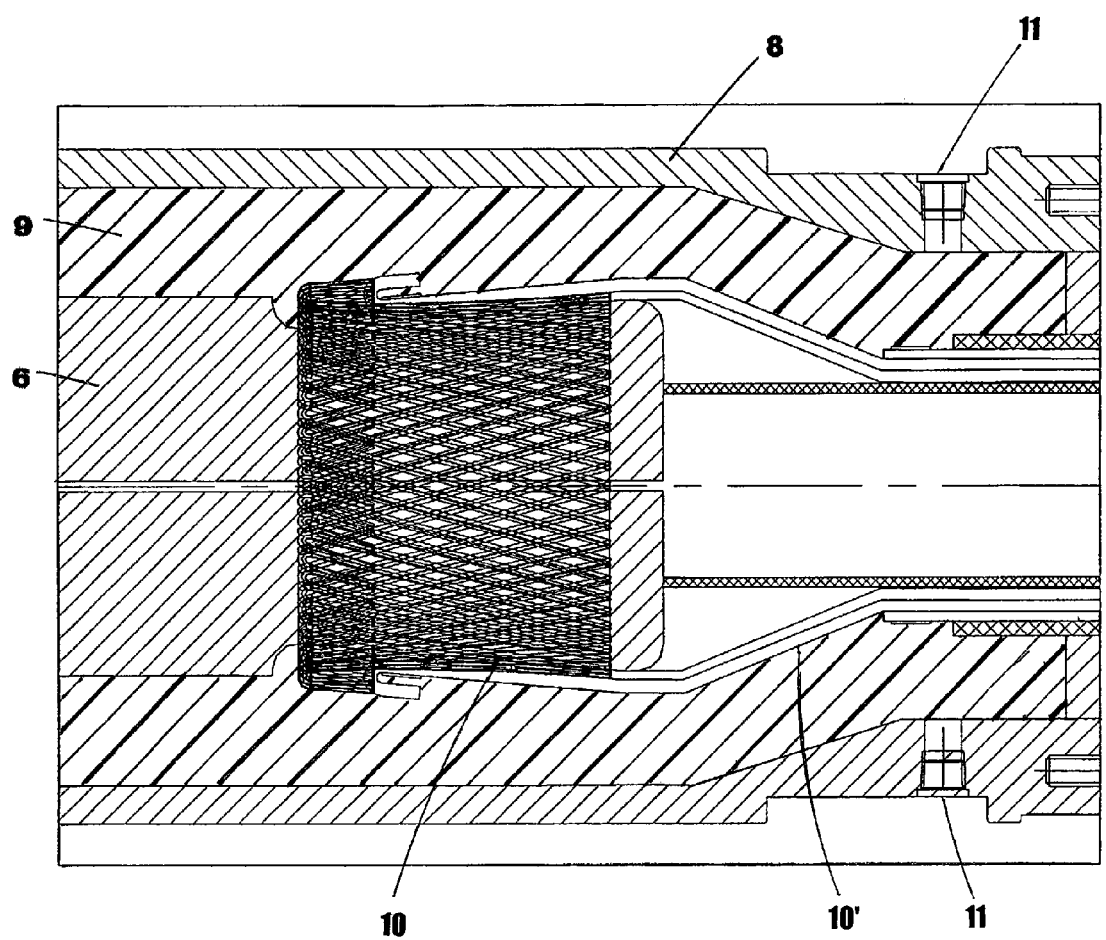
FIG. 2 is a detail of the anchoring system of FIG. 1.

As can be inferred from FIG. 2, the armors 10, 10', partly represented in the detail of its structure, comprise a mesh of interwoven threads/wires. In FIG. 2, the sections of the armors 10 are represented with round thread/wire. Alternatively, however, the threads/wires of the armors 10 may have a rectangular cross-section.

Further in FIG. 2, one can see bores 11 foreseen in the cover 8, through which the resin 9 that fills its internal space is injected.

Figure 3:
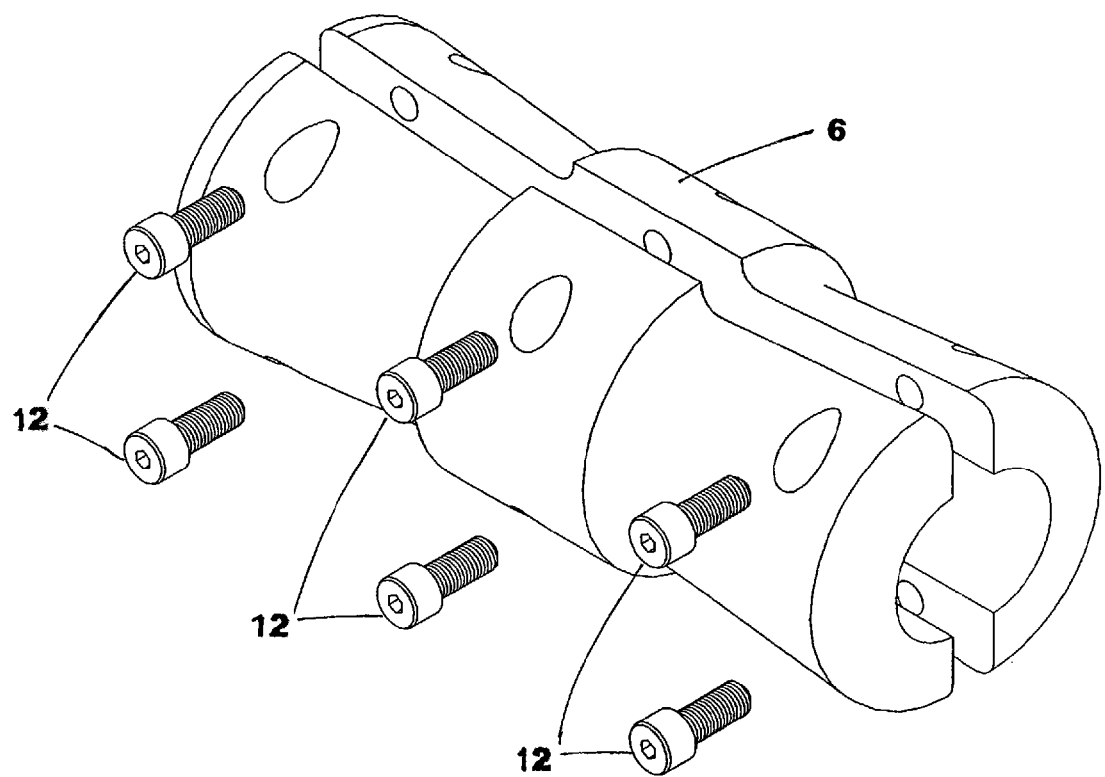
FIG. 3 is an isometric view of the double split ending.

FIG. 3 illustrates, in perspective, the double split ending 6 and the respective fixation screws 12 for fixing the halves to each other. The double ending 6 embraces the flexible tube 5 so as to maintain its continuity.

The flexible tube 5 may be a riser, a jumper or an umbilical.

In addition to the embodiment presented before, the same inventive concept may be applied to alternatives or possibilities of use of the invention. Thus, it should be understood that the present invention should be interpreted in a broad way, its scope being determined by the terms of the accompanying claims, which include its equivalents.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A fixation assembly for a stiffener of a protective assembly that protects a flexible tube against wear due to friction, the flexible tube having armors, the assembly comprising:

a stiffener which is fixed on the flexible tube, the stiffener comprising a centralizer suitable for resting against an inner wall of an I-tube and for guiding the displacements of the stiffener inside the I-tube;

a split sleeve mounted around the flexible tube and adapted to be fixed on said flexible tube by the armors of the flexible tube; and a cover mounted over the split sleeve and the flexible tube, the cover forming a space around the split sleeve and the space is suitable for being internally filled with a resin.

2. A fixation assembly according to claim 1, wherein the armors comprise a thread or wire structure in the form of a mesh.

3. A fixation assembly according to claim 2, wherein the threads/wires have a rounded or rectangular cross-section.

4. A fixation assembly according to claim 1, further comprising a trumpet mounted on the stiffener by means of the centralizer, the trumpet being maintained solid with the flexible tube.

5. A fixation assembly according to claim 1, wherein the flexible tube is a riser, a jumper or an umbilical.

6. A fixation assembly according to claim 1, further comprising an epoxy resin in the space.

* * * * *